Sept. 11, 1956  G. A. LYON  2,762,469
WHEEL COVER
Filed Sept. 25, 1953
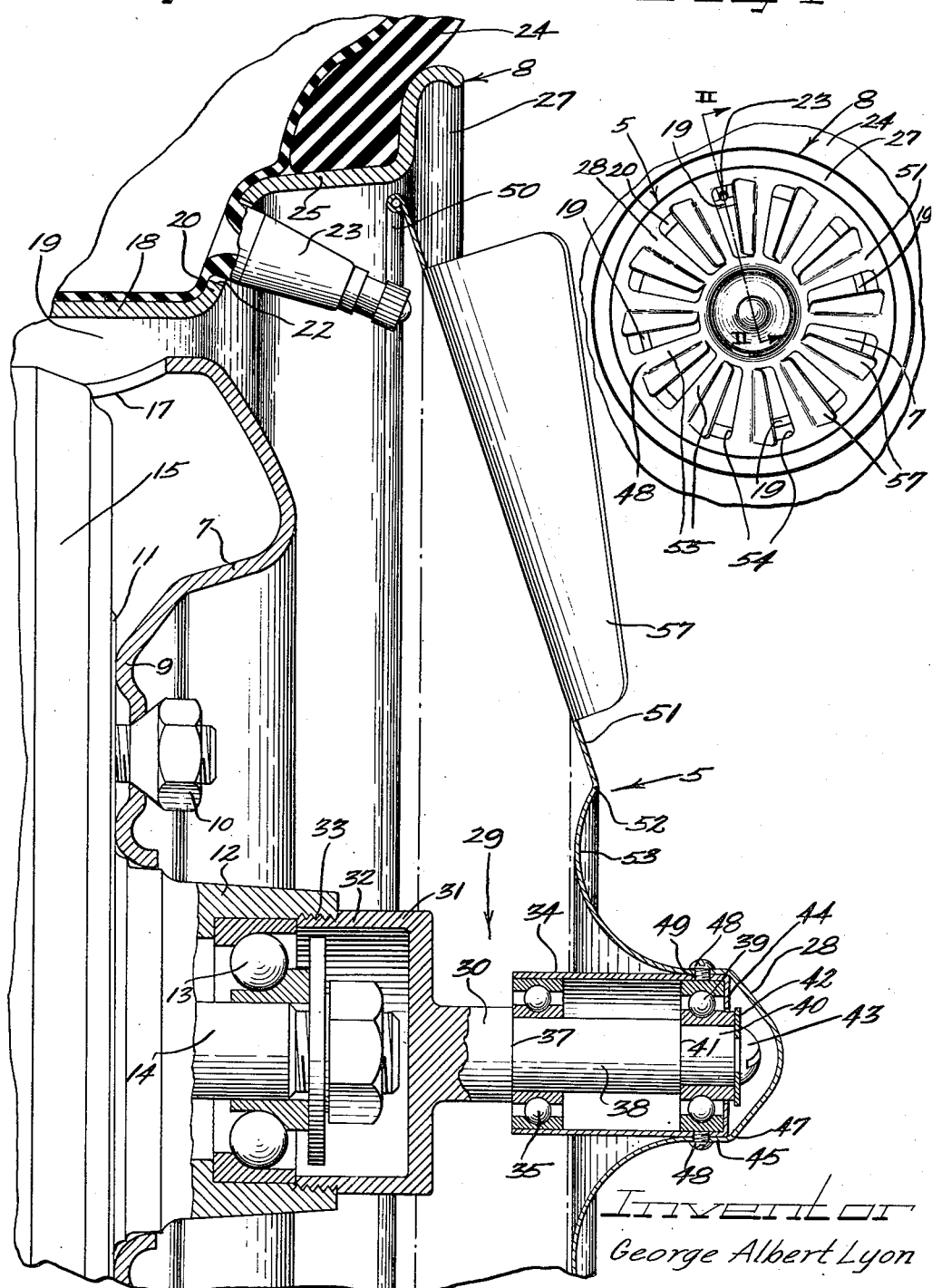
Inventor
George Albert Lyon

United States Patent Office 2,762,469
Patented Sept. 11, 1956

2,762,469

WHEEL COVER

George Albert Lyon, Detroit, Mich.

Application September 25, 1953, Serial No. 382,385

4 Claims. (Cl. 188—264)

The present invention relates to improvements in wheel structures and more particularly concerns the provision of novel ornamental means for the outer sides of vehicle wheels.

An important object of the present invention is to provide an improved wheel structure wherein a cover for the outer side of the wheel is equipped with novel air circulation promoting means.

Another object of the invention is to provide improved means for disposition at the outer side of a vehicle wheel to afford not only an ornamental cover but to promote movement of brake drum cooling air through the wheel.

A further object of the invention is to provide an air circulation promoting type of wheel cover which will be effective to move air through a wheel in the same direction irrespective of the direction of rotation of the wheel in service, so that the same cover can be applied to either a right or left side wheel of a vehicle and yet cause movement through the wheel, for example, from the inside of the wheel toward the outside past the brake drum associated with the wheel.

Still another object of the invention is to provide a wheel cover for disposition at the outer side of the vehicle wheel in freely relatively rotatable relation to the wheel.

Other objects, features and advantages of the present invention will be readily apparent from the following detailed description of a preferred embodiment thereof taken in conjunction with the accompanying drawing in which:

Figure 1 is a side elevational view of a vehicle wheel embodying features of the present invention; and Figure 2 is an enlarged, fragmentary radial sectional view taken substantially on the line II—II of Figure 1.

A wheel cover 5 is adapted to be mounted in substantial covering relation at the outer side of a vehicle wheel comprising a wheel body 7 of the disk spider type carrying a multi-flange tire rim 8. The wheel body 7 has a central dished bolt-on flange 9 by which the wheel is adapted to be secured as by means of attachment bolts 10 to a flange 11 of a hub 12 which may be rotatably mounted as by means of bearings 13 upon an axle member 14 such as the kingpin of a front wheel suspension of a vehicle while if the wheel is mounted on the rear axle the hub 12 will, of course, be keyed to the axle where the vehicle is a rear wheel drive type. Carried by the flange 11 is a brake drum 15.

At its outer periphery the wheel body 7 is provided with generally axially extending flange 17 by which the body is attached in suitable manner to a base flange 18 of the tire rim 8. At suitable intervals such as four, the flange 17 is inset to provide air circulation openings 19 by which air may circulate through the wheel in cooling relation to the brake drum 15.

Extending generally radially outwardly from the outer side of the base flange 18 is a side flange 20 on the tire rim having a valve stem aperture 22 through which projects a valve stem 23 of a pneumatic tire and tube assembly 24 supported by the tire rim. An intermediate flange 25 slopes generally axially and radially outwardly from the outer extremity of the side flange 22 and then merges with a generally radially outwardly and axially outwardly turned terminal flange 27 of the tire rim.

According to the present invention, the cover 5 is constructed and arranged to be mounted upon the hub 12 associated with the wheel in service but to rotate relative to the hub and to the wheel. To this end, the cover 5 comprises a preferably circular disk of sheet material such as stainless steel, brass or other sheet stock which may be finished in any preferred manner such as polished or plated and polished or painted. The cover disk has at its center a crown structure 28 provided therebehind, that is at the inner side of the cover, with an attachment structure 29 by which the cover is mounted in service relation to the wheel by attachment to the hub 12. In a convenient form, the attachment structure 29 comprises a spindle 30 having a generally cup-shaped attachment base 31 provided with an externally threaded flange 32 adapted to be screwed tightly into internal threads 33 within the outer marginal portion of the flange of the hub 12. Thereby the spindle cup not only mounts the spindle 30 concentrically with the hub 12 but also serves as a closure or dust cap for the end of the hub.

On its outer or head portion, the spindle 30 carries a rotary cover connector 34, herein preferably in the form of a cylindrical tubular member. For rotatably mounting the connector 34 upon the spindle 30, an inner bearing assembly 35 is mounted within the inner end portion of the connector tube and against a shoulder 37 at the inner end portion of an intermediate reduced diameter section 38 of the spindle. Within the outer end portion of the connector tube 34 is mounted a bearing assembly 39 which engages about a further reduced diameter head portion 40 providing at its base a shoulder 41 against which the inner race of the bearing assembly engages and is held by a washer disk 42 removably secured in place as by means of a screw 43. A retaining and protective flange 44 may be provided on the outer extremity of the connector tube 34 to project radially inwardly and overlie the outer race of the bearing assembly 39 which is preferably slightly narrower than the inner race so that the inner race will project axially outwardly beyond the flange 44 for retaining clamping engagement by the retaining washer member 42.

Attachment of the cover crown 28 to the connector 34 is effected in suitable manner, as for example by telescoping a generally cylindrical crown side wall portion 45 about the outer end portion of the connector 34 and with the shoulder provided at juncture of the flange 44 with the body of the connector bearing as a limit stop against a shoulder 47 afforded at juncture of the cylindrical crown side wall with the crown top. Detachable fastening means such as screws 48 extending through the crown side wall 45 and threaded into tapped screw sockets 49 in the connector 34 are provided for retaining the cover detachably on the connector. Through this arrangement, the cover 5 is mounted for rotation concentrically relative to the wheel in service.

For air circulation promoting purposes, the cover 5 is equipped to be motivated by slipstream air in running of the wheel to effect movement of the air through the wheel openings 19 and preferably from the inside of the wheel toward the outside. To this end, the cover plate 5 is dimensioned to completely overlie the wheel body 7 and at least a substantial portion of the tire rim 8, being shown herein as of a diameter to lie closely adjacent to the juncture between the intermediate flange 25 and the terminal flange 27 of the tire rim. At its outer extremity the cover is provided with a finishing and reinforcing or stiffening bead 50 turned under and in service position lying in spaced adjacent relation to the tire rim.

In a preferred form the main body portion of the cover comprises an annular radially outwardly and axially inwardly sloping generally frusto-conical outer portion 51 which at its inner margin projects substantially axially outwardly beyond the extremity of the tire rim terminal flange 27 and preferably to a sufficient extent to intercept the slipstream of air moving past the wheel while running. For rigidity the major body portion 51 is secured to the crown 28 by means of an annular rib reinforced structure comprising a short radius juncture rib 52 at the inner extremity of the cover portion 51 and a larger or longer radius dished rib portion 53 joining the crown side wall 49.

For promotion of air circulation through the wheel, the major cover body portion 51 is provided with a uniform series of radially extending elongated openings or apertures 54 of substantial width and preferably tapering toward maximum width at their radially outer ends. The arrangement is such that the widest, radially outer ends of the air openings 54 are opposite the wheel openings 19. At the radially inner and radially outer ends of the openings 54 continuous annular portions of the cover body 51 connect with spoke-like radially extending integral portions 55 intervening between the openings 54.

Projecting generally axially outwardly and slanting in a common peripheral direction from one side of the openings 54 are respective wing-like vanes 57 which are derived from the material struck out in forming the openings 54. Conformable to the dimension of the openings 54, the vanes 57 flare from narrower width at their radially inner ends toward wider dimension at the radially outer ends. At their radially inner ends, the vanes 57 project axially outwardly to the maximum extent of the vanes so as to be efficiently engaged by the slipstream air in the relative rotary position of the vanes wherein they extend forwardly with respect to movement of the associated vehicle. As a result, as the vehicle moves forwardly, the vanes which are projecting forwardly will be engaged by the air moving rearwardly past the wheel, in the manner of impeller blades and cause the cover to be rotated in a manner to carry the remaining vanes 57 in generally reverse direction to the movement of slipstream air, whereby to effect an eduction of air from within the substantial chamber defined behind the cover and thereby promote circulation of air from the inner side of the wheel through the wheel openings 19 and in cooling relation past the brakedrum 15.

Having reference to Figure 1, if the wheel is moving forwardly toward the left, the uppermost vanes will be engaged as impellers by the slipstream air to rotate the cover clockwise. On the other hand, if the wheel is moving forwardly toward the right as viewed in Figure 1, the lowermost vanes 57 will be engaged as impellers by a slipstream of air to cause movement of the cover rotatably clockwise as depicted in Figure 1.

Since the openings 54 are widest at their radially outer ends, access therethrough to the valve stem 23 is easily effected, as visualized in Figure 1.

It will be understood that modifications and variations may be effected without departing from the scope of the novel concepts of the present invention.

I claim as my invention:

1. In a wheel structure including a wheel body and a tire rim with openings through the wheel adjacent juncture of the tire rim and the wheel body and with a brake drum behind the wheel body adapted to be cooled by circulation of air through said openings, a cover for disposition at the outer side of the wheel comprising a sheet metal stamping of a diameter to cover the wheel body and to extend into substantial concealing relation to the outer side of the tire rim and said wheel openings, the cover comprising a plate sloping axially outwardly from its radially outer extremity toward a central axially outwardly projecting hub embossment that opens axially inwardly, a spindle member carried centrally by the wheel and projecting to a substantial extent axially outwardly beyond the tire rim, and bearing structure within said central embossment of the cover and rotatably carrying the cover on said spindle with the outer margin of the cover adjacent to the tire rim and with the major extent of the cover projecting axially outwardly beyond the tire rim so as to compel impingement of slipstream air against the cover, the cover having a uniform series of generally radially extending elongated openings for air circulation therethrough and with vanes at the sides of the opening projecting outwardly for engagement by slipstream air in the movement of the wheel during travel of an associated vehicle to effect rotation of the cover by action of the slipstream air on the vanes for inducing movement of air through the cover openings and through the wheel openings for cooling the brake drum.

2. In a wheel structure including a wheel body and a tire rim with openings through the wheel adjacent juncture of the tire rim and the wheel body and with a brake drum behind the wheel body adapted to be cooled by circulation of air through said openings, a cover for disposition at the outer side of the wheel comprising a sheet metal stamping of a diameter to cover the wheel body and to extend into substantial concealing relation to the outer side of the tire rim and said wheel openings, the cover comprising a plate sloping axially outwardly from its radially outer extremity toward a central axially outwardly projecting hub embossment that opens axially inwardly, a spindle member carried centrally by the wheel and projecting to a substantial extent axially outwardly beyond the tire rim, and bearing structure within said central embossment of the cover and rotatably carrying the cover on said spindle with the outer margin of the cover adjacent to the tire rim and with the major extent of the cover projecting axially outwardly beyond the tire rim so as to compel impingement of slipstream air against the cover, the cover having a uniform series of generally radially extending elongated openings for air circulation therethrough and with vanes at the sides of the openings projecting outwardly for engagement by slipstream air in the movement of the wheel during travel of an associated vehicle to effect rotation of the cover by action of the slipstream air on the vanes for inducing movement of air through the cover openings and through the wheel openings for cooling the brake drum, said bearing structure including a barrel member telescopically engageable within the embossment and secured to the embossment by screws projecting through the wall of the embossment into the barrel.

3. In a wheel structure including a wheel body and a tire rim with openings through the wheel adjacent juncture of the tire rim and the wheel body and with a brake drum behind the wheel body adapted to be cooled by circulation of air through said openings, a cover for disposition at the outer side of the wheel comprising a sheet metal member of a diameter to cover the wheel body and to extend into substantial concealing relation to the outer side of the tire rim and said wheel openings, the cover comprising a plate sloping axially outwardly from its radially outer extremity toward a central hub, a spindle member carried centrally by the wheel and projecting to a substantial extent axially outwardly beyond the tire rim, and bearing structure within said hub of the cover and freely rotatably carrying the cover on said spindle with the outer margin of the cover adjacent to the tire rim and with the major extent of the cover projecting axially outwardly beyond the tire rim so as to compel impingement of slipstream air against the cover, the cover having a circumferentially spaced series of openings for air circulation therethrough and with vanes at the sides of the opening projecting outwardly for engagement by slipstream air in the movement of the wheel during travel of an associated vehicle to effect rotation of the cover by action of the slipstream air on the vanes for inducing movement of air through the cover openings and through the wheel openings for cooling the brake drum.

4. In a wheel structure including a wheel body and a tire rim with openings through the wheel adjacent juncture of the tire rim and the wheel body and with a brake drum behind the wheel body adapted to be cooled by circulation of air through said openings, a cover for disposition at the outer side of the wheel comprising a sheet metal member of a diameter to cover the wheel body and to extend into substantial concealing relation to the outer side of the tire rim and said wheel openings, the cover comprising a plate sloping axially outwardly from its radially outer extremity toward a central hub, a spindle member carried centrally by the wheel and projecting to a substantial extent axially outwardly beyond the tire rim, and bearing structure within said hub of the cover and freely rotatably carrying the cover on said spindle with the outer margin of the cover adjacent to the tire rim and with the major extent of the cover projecting axially outwardly beyond the tire rim so as to compel impingement of slipstream air against the cover, the cover having a circumferentially spaced series of generally radially extending elongated openings flaring toward maximum width at their radially outer ends adapted for air circulation therethrough and with vanes at the sides of the openings derived from the material of the cover plate in forming the openings and having maximum width at their radially outer ends, said vanes projecting generally axially outwardly from the cover plate for engagement by slipstream air in the movement of the wheel during travel of an associated vehicle to thereby effect rotation of the cover by action of the slipstream air on the vanes for inducing movement of air through the cover openings and through the wheel openings for cooling the brake drum.

References Cited in the file of this patent

UNITED STATES PATENTS

| | | |
|---|---|---|
| 1,432,274 | Braucher I | Oct. 17, 1922 |
| 1,501,094 | Braucher II | July 15, 1924 |
| 1,739,577 | Cantu | Dec. 17, 1929 |
| 1,850,588 | Lambert | Mar. 22, 1932 |
| 2,022,174 | Allee | Nov 26, 1935 |
| 2,181,364 | Burger | Nov. 28, 1939 |

FOREIGN PATENTS

| | | |
|---|---|---|
| 200,689 | Great Britain | July 19, 1923 |
| 787,597 | France | Sept. 25, 1935 |